Patented July 26, 1927.

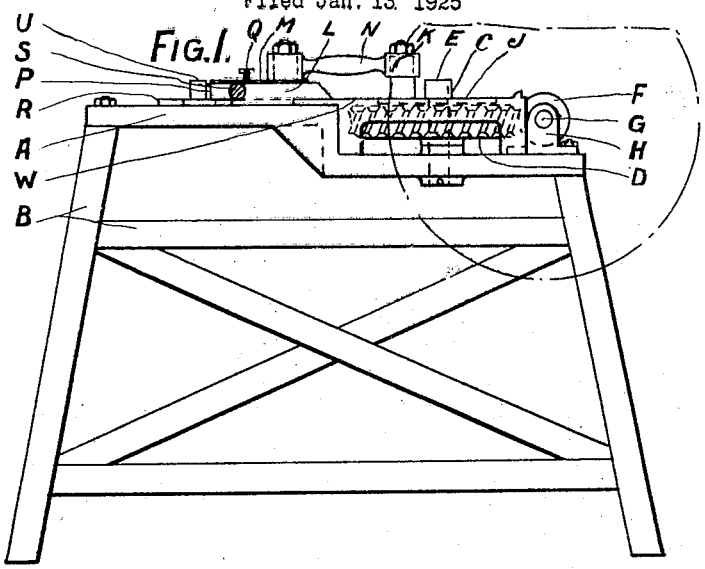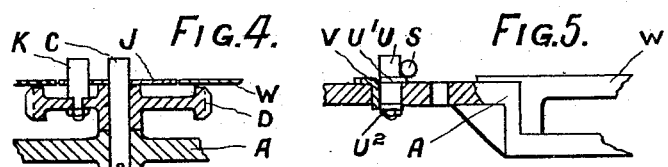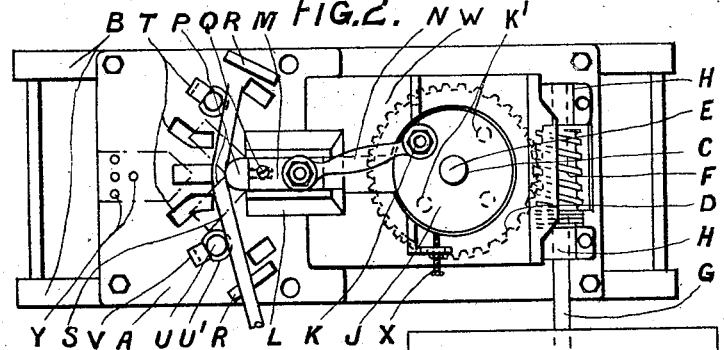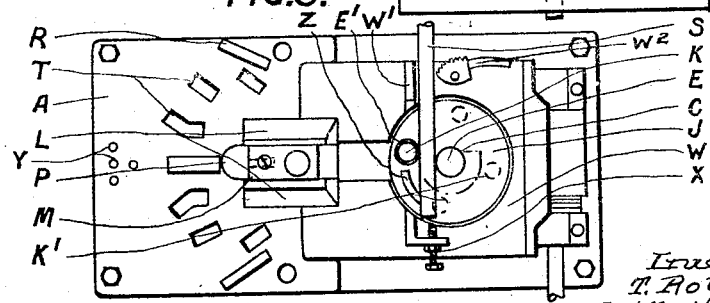

1,636,786

UNITED STATES PATENT OFFICE.

THOMAS ROLLEY, OF BRISBANE, QUEENSLAND, AUSTRALIA.

METAL-BENDING MACHINE.

Application filed January 13, 1925, Serial No. 2,230, and in Australia June 16, 1924.

This invention relates to an improved machine for bending rods, bars, angles, T's, and other sections of iron, steel, or other metal, the object being to provide a machine by which the metal may be readily and conveniently bent to any angle or bent as may be required. The machine is readily adaptable for shearing such metal.

In carrying out my invention I provide a bedplate (supported on a frame), which carries a worm wheel and worm driven from any source of power supply, and formed with holes of suitable shape to receive pegs, against which, in certain cases, the metal is bent. A pusher, slidable between or on guides formed on the bedplate, is operated by a connecting rod from the worm wheel. The metal, in other cases, is bent by means of the crank pin, spindle, (on which the worm wheel rotates), and a projection on the bedplate or a table carried by same.

In order that my invention may be better understood I will now describe it with the aid of the accompanying drawings, in which Fig. 1 is a side elevation.

Fig. 2 is a plan.

Fig. 3 is another plan (part of the machine being removed).

Figs. 4 and 5 are details in section.

The bedplate A, which is preferably arranged horizontally, is supported by the frame B, which is strongly braced. The spindle C, on which the worm wheel D rotates, is rigidly carried by the bedplate A. The upper end E of the spindle C, which projects above the worm wheel D, may be of any suitable diameter, spindles of different diameter upper end being substituted according to the work to be done. The worm wheel D is driven by the worm F carried on the shaft G, which runs in bushings or bearings H, on the bedplate A, and which is driven from any source of power supply, fast and loose pulleys being provided on the shaft G. The worm wheel D is provided with a table top in the form of a disc J, through which the spindle C and the crank pin K project. Additional crank pin holes $K^1$ may be provided in the worm wheel D. Sleeves $E^1$ of different outside diameters are provided for placing on the crank pin K when desired to reduce friction between the work and the adjustable pin.

Guides L are formed on, or carried by, the bedplate A, and guide between them the pusher M, which is operated by the connecting rod N from the crank pin K on the worm wheel D. A head P is fitted on the end of the pusher M in such a manner that it can be readily adjusted as to position or removed when desired, a set screw Q being provided to secure it in position.

The bedplate A is formed with ridges R, the tops of which are in alignment, and on which the metal S rests while being bent by the operation of the pusher M.

The bedplate A is also formed with holes or slots T of square, rectangular, or other suitable shape. They are placed in convenient relation to the pusher M and are to receive two or more pegs U. The pegs U, which are formed with a shoulder $U^1$ flattened on one side, are secured in the desired hole or slot T by a nut and washer $U^2$. Packing pieces V, which may be of different thicknesses, as desired, are used to adjust the position of the pegs U.

The worm wheel D is protected by means of the raised portion W, which serves as a table on which the metal S rests when being bent by the crank pin K and spindle C. The table W has a projection $W^1$ formed thereon. If desired, this projection $W^1$ may be arranged to receive an adjusting block of the desired width. An adjustable screw X is fitted on the table W and, as suggested in Fig. 3, constitutes an adjustable stop for work engaged between the upper end of the spindle E and the pin K. A grip $W^2$ may be provided for holding the rods, etc., while being bent.

A bending block may also be secured by studs or other means in the holes Y, suitably shaped heads P being secured in the pusher M, as shown by broken lines. Blocks and suitably shaped heads may be secured on the bedplate A and in the pusher M for shearing the metal bars, etc.

A lug Z, with an inclined upper face, is formed on the device J to throw up the ends of the rods after they are bent in cases where a larger bend than shown by broken lines in Fig. 3 is required.

The details of construction may be varied as desired. Other spindles C and/or crank pins K of heavier formation may be provided for use when required for bending, if desired.

The method of using my invention is as follows:—

When it is desired to bend the rod or other piece of metal to the shape other than a U or modification thereof, I use the pusher M and pegs U, as shown in Fig. 2. Two or more of these pegs U, as the case requires, are secured in the holes or slots T as will give the desired result. The machine having been set in motion, the metal S to be bent is placed on the ridges R against the pegs U. The pusher M, in its forward movement, presses against the metal S, and, jamming it against the pegs U, bends it to the desired shape. A bending block may be secured at Y.

When it is desired to bend the metal S into the form of a U or modification thereof, I remove the connecting rod N and place sleeves E¹, of suitable outside diameter, according to the diameter of the rod or size of the metal to be bent, on the spindle C and crank pin K respectively. The metal to be bent is placed in position on the table W against the projection W¹ end on to the adjusting screw X or with the end in position as desired, and gripped by the grip W².

The crank pin K is placed in either the holes K¹ on the worm wheel D, as required, to equalize the wear on the worm wheel D and worm F.

The speed of movement of the machine is such that there is ample time for the metal to be placed in position, and, when bent, to be removed.

Although I prefer to use a worm wheel and worm, as described, I do not wish to bind myself to such drive, as I may use a spur wheel and pinion for the same purpose.

Having now particularly described and ascertained the nature of my said invention and in what manner the same is to be performed, I declare that what I claim is:—

1. In a metal bending machine, a support, a plurality of work retaining members, carried by said support, a pusher bar associated with certain of the work retaining members for bending work, a rotatable member, an upstanding center stud and a crank pin both carried by said rotatable member, and a removable connecting rod engaged with the crank pin and the pusher bar for operating the latter and adapted, upon removal, to permit work engaged with other of the work retaining members to be engaged between the center stud and crank pin for further bending operations.

2. A metal bending machine as claimed in claim 1 characterized by the provision of an adjustable stop for work engaged with the last mentioned retaining means.

3. A machine as claimed in claim 1 characterized by the provision of friction reducing members adapted to be engaged with the center stud and crank pin interchangeably with the connecting rod.

In testimony whereof I affix my signature.

THOMAS ROLLEY.